Figure 5:
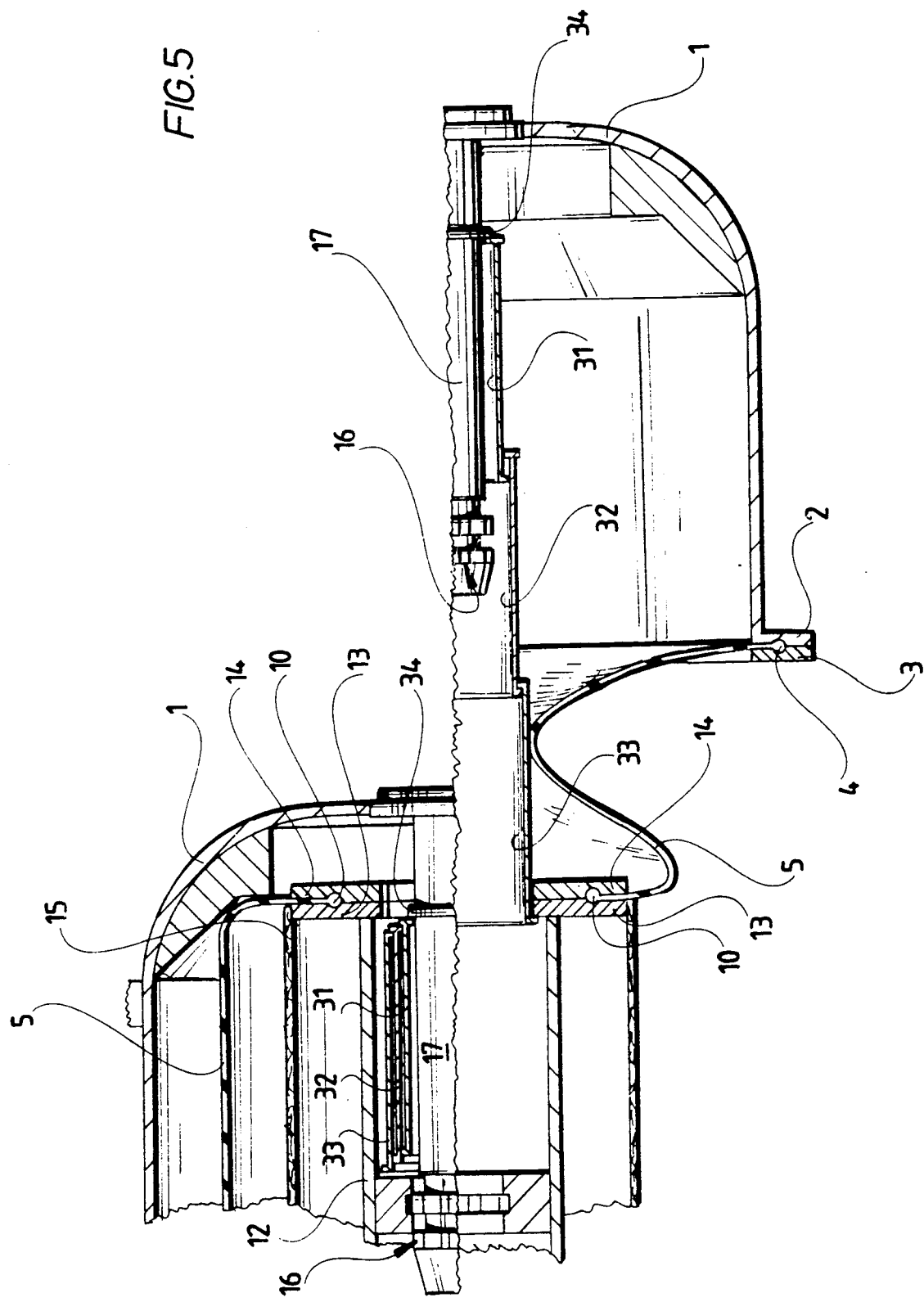

United States Patent [19]
Gerteis

[11] Patent Number: 5,139,665
[45] Date of Patent: Aug. 18, 1992

[54] PROCESS AND DEVICE FOR TURNING IN THE MEMBRANE OF A PRESSURE FILTER FOR SUSPENSIONS

[75] Inventor: Hans Gerteis, Bietigheim-Bissingen, Fed. Rep. of Germany

[73] Assignee: Heinkel Industriezentrifugen GmbH & Co., Bietigheim-Bissingen, Fed. Rep. of Germany

[21] Appl. No.: 671,739

[22] PCT Filed: Aug. 10, 1989

[86] PCT No.: PCT/EP89/00944
§ 371 Date: Jul. 8, 1991
§ 102(e) Date: Jul. 8, 1991

[30] Foreign Application Priority Data
Nov. 11, 1988 [DE] Fed. Rep. of Germany ....... 3838296

[51] Int. Cl.⁵ ............................................. B01D 29/82
[52] U.S. Cl. .................................. 210/236; 210/408; 210/457; 100/211; 264/101
[58] Field of Search ............... 210/650, 435, 440, 455, 210/416.1, 232, 450, 350, 236, 457, 408, 391, 399; 100/211; 264/101

[56] References Cited
U.S. PATENT DOCUMENTS

| | | | |
|---|---|---|---|
| 3,713,382 | 1/1973 | Gwilliam | 100/211 |
| 3,753,499 | 8/1973 | Gwilliam | 100/211 |
| 4,246,122 | 1/1981 | Keat | 210/350 |
| 4,634,527 | 1/1987 | Marshall | 210/450 |
| 4,702,831 | 10/1987 | Gerteis | 100/211 |
| 4,707,256 | 11/1987 | Gerteis | 100/211 |

FOREIGN PATENT DOCUMENTS
2549040 7/1977 Fed. Rep. of Germany .
3516819 11/1988 Fed. Rep. of Germany .

Primary Examiner—Robert A. Dawson
Assistant Examiner—Ana M. Fortuna
Attorney, Agent, or Firm—Shenier & O'Connor

[57] ABSTRACT

A pressure filter for suspensions comprises a boiler-shaped outer jacket, a lid coaxially movable relative to the latter and closing the outer jacket, a filter element protruding from the lid and a reversible membrane arranged coaxially between the outer jacket and the filter element so as to turn out of the outer jacket when the filter is opened and to turn back into the outer jacket again when the filter is closed. When the filter is being closed, a negative pressure relative to ambient pressure is generated inside the membrane, and to prevent formation of a single fold protruding at the sides beyond the rim of the outer jacket, the membrane is deformed by external influences until a triple or multiple fold no longer protruding at the sides beyond the rim of the outer jacket forms in the membrane.

3 Claims, 3 Drawing Sheets

FIG.1
FIG.3
FIG.4
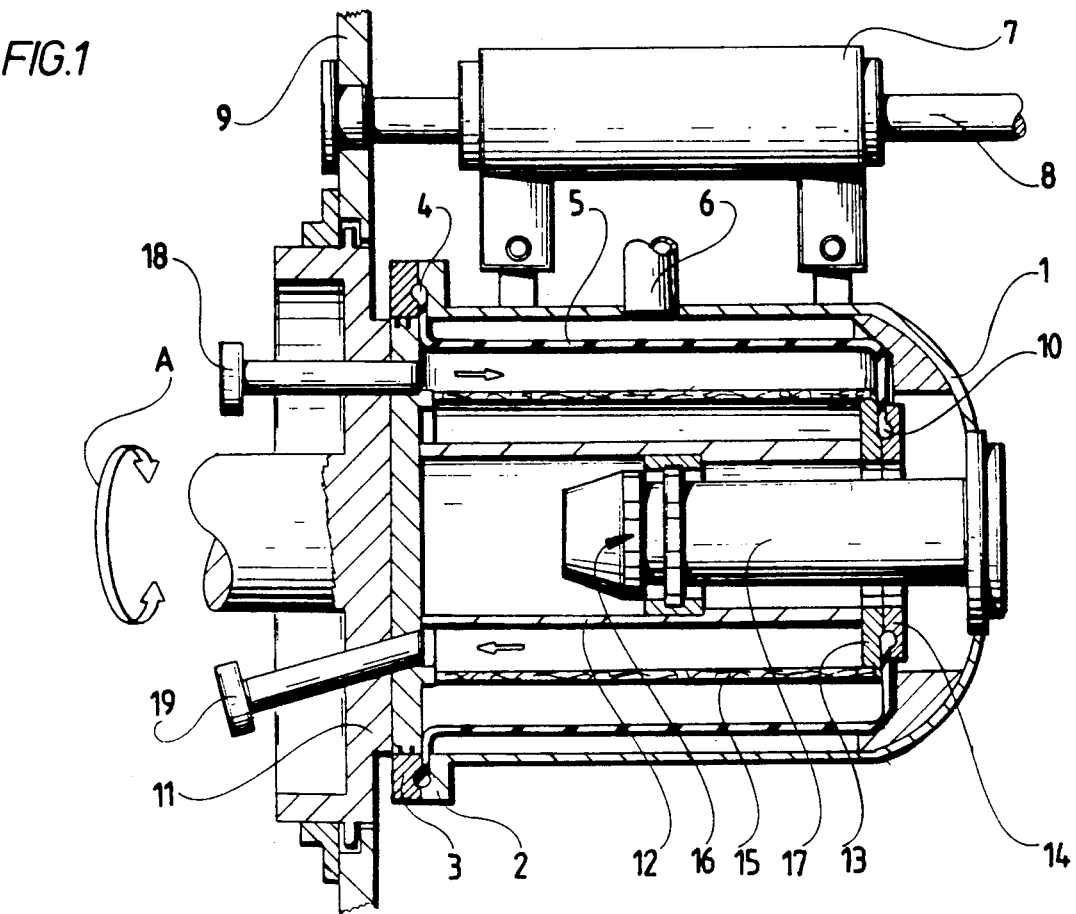
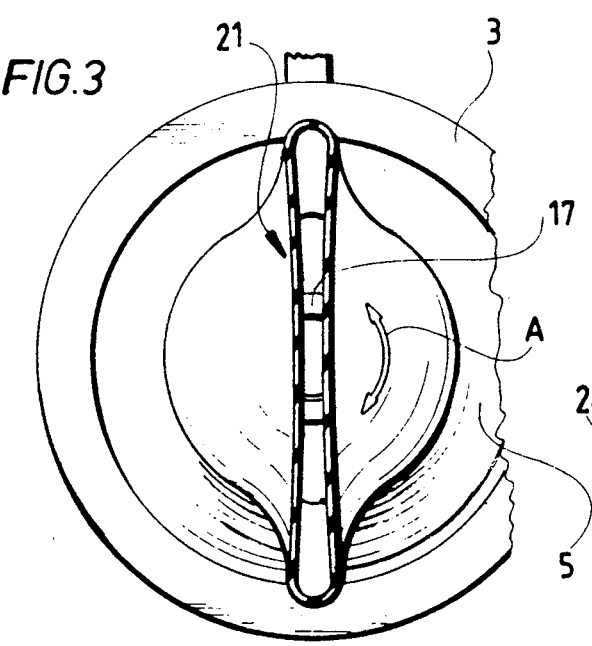
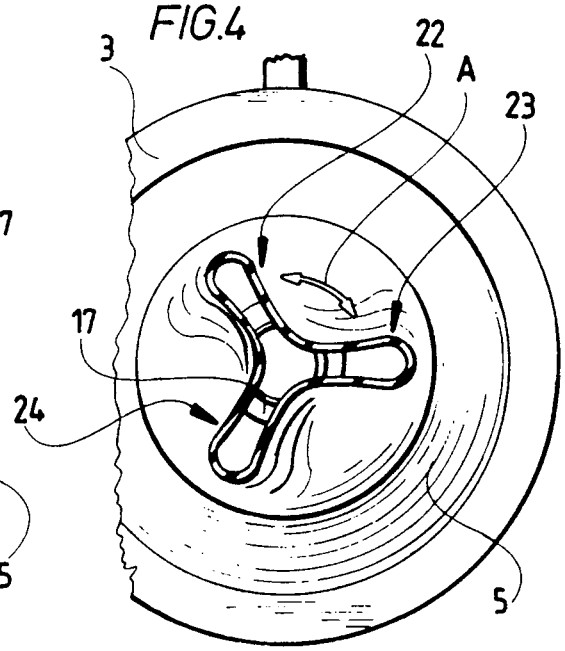

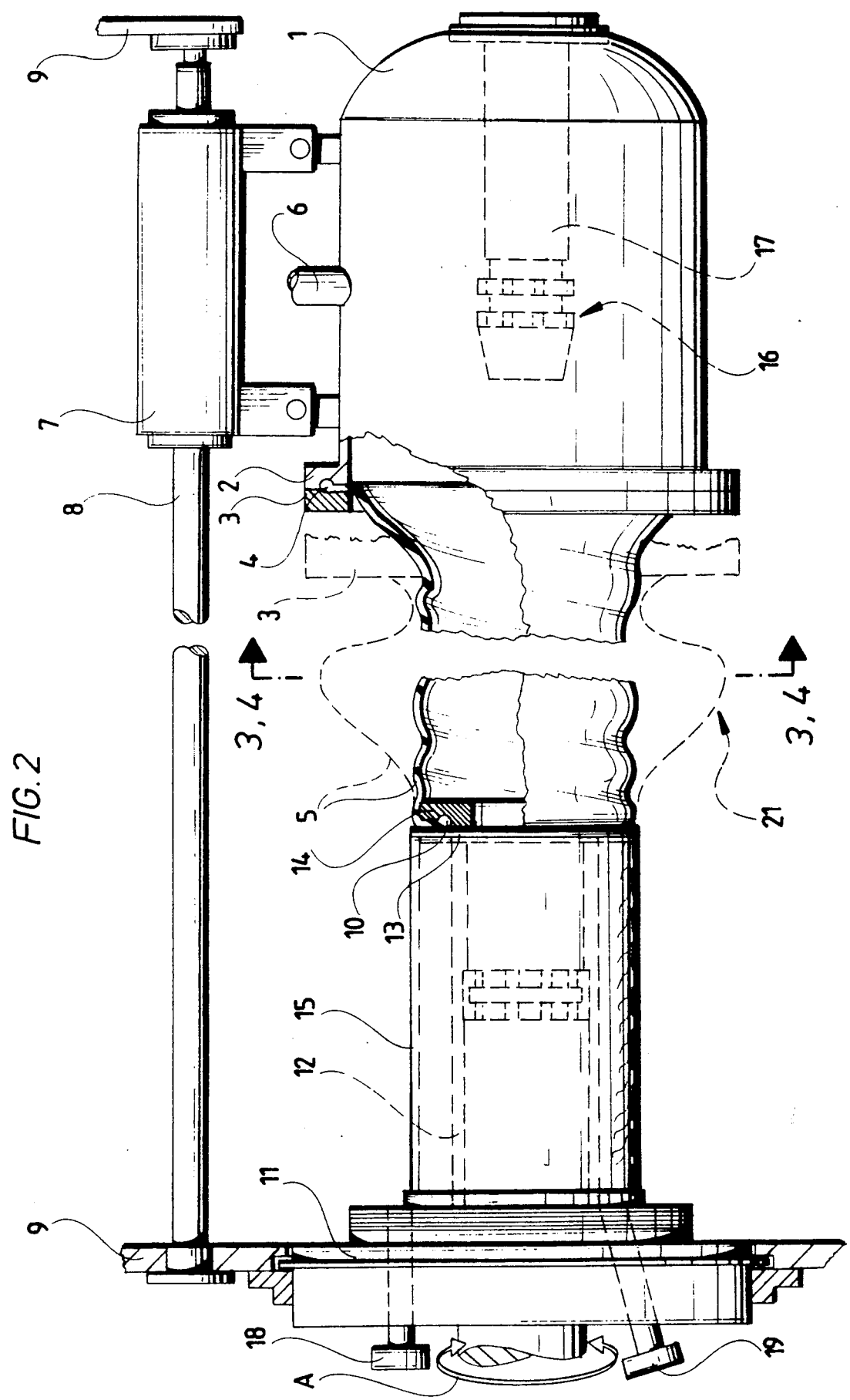

PROCESS AND DEVICE FOR TURNING IN THE MEMBRANE OF A PRESSURE FILTER FOR SUSPENSIONS

The invention relates to a process and a device for turning in the membrane of a pressure filter for suspensions comprising a boiler-shaped outer jacket, a lid coaxially movable relative to the outer jacket and releasably closing the outer jacket on the open end face thereof, a tubular filter element projecting from the lid coaxially with the axis of the outer jacket, an elastic, tubular membrane arranged coaxially between the outer jacket and the filter element and connected at its one rim to the open end face of the outer jacket and at its other rim to the free end face of the filter element remote from the lid in such a way that when lid and outer jacket are coaxially moved apart, it turns out of the outer jacket and when lid and outer jacket are coaxially brought together, it turns back into the outer jacket again.

A pressure filter of this kind is known from German published patent application 35 16 819. When lid and outer jacket are brought together, i.e., when the filter is being closed, difficulties are known to arise with the turning of the membrane into the outer jacket and, in particular, these lead to the outer side of the membrane entering into rubbing contact with the rim of the outer jacket opening and thereby becoming damaged in the course of time.

The object of the invention is to remedy this deficiency and to indicate a process for turning in the membrane of a pressure filter of the kind mentioned hereinabove which can be carried out without damaging the membrane.

In accordance with the invention, the object is achieved in that when lid and outer jacket are brought together, a negative pressure relative to ambient pressure is formed inside the membrane and to prevent formation of a single fold protruding at the sides beyond the rim of the outer jacket, the membrane is deformed by external influences until a triple or multiple fold no longer protruding at the sides beyond the rim of the outer jacket forms in the membrane.

The following description of a preferred embodiment of such a process and devices suitable for the performance of the process serves in conjunction with the appended drawings to explain the invention in further detail. The drawings show:

FIG. 1 a pressure filter with a reversible membrane in the closed state;

FIG. 2 the filter of FIG. 1 in the open state with the membrane turned out;

FIGS. 3 and 4 sectional views along line 3,4—3,4 in FIG. 2 and FIG. 4;

FIG. 5 schematically a longitudinal sectional view of an open pressure filter with protection means.

The pressure filter illustrated in the drawings comprises a boiler-shaped outer jacket 1 of round cross-section which is closed at its one end face (on the right in FIGS. 1 and 2) and open at its opposite end face. At its open end face, the outer jacket 1 carries a circumferential flange comprised of two parts 2, 3 between which the one rim region 4 of a tubular membrane 5 made of elastic material is firmly clamped. From the outer jacket 1 there extends upwards a suction and compression connection piece 6. The outer jacket 1 is also releasably connected via a carrier construction, not described in detail herein, to a bushing 7 which, for its part, is slidable on a stationary rod 8 parallel to the axis of the outer jacket 1.

A lid 11 for sealed closure of the open end face of the outer jacket 1 is mounted on a machine frame 9 carrying the rod 8 for rotation (double arrow A) coaxially with the outer jacket 1. A pipe 12 protrudes rigidly from the inner side of the lid 11 that faces the outer jacket 1. This pipe 12 carries at its free end an end face flange which is comprised of two parts 13, 14 similarly to the flange at the opening of the outer jacket 1. The other rim 10 of the membrane 5 is firmly clamped between these parts 13, 14.

A tubular filter element 15, for example, in the form of a screen cylinder covered with a filter cloth extends between the inner side of the lid 11 and the flange part 13. The filter element 15 is in sealed contact with the inner side of the lid 11 and the flange part 13, respectively.

When the filter is in the closed state, i.e., when lid 11 and outer jacket 1 are united (FIG. 1), the tubular membrane 5 extends coaxially between the inner side of the outer jacket 1 and the outer side of the filter element 15. When the pressure filter is in the open state, i.e., when lid 11 and outer jacket 1 are moved apart in the direction of their common axis (FIG. 2), the membrane 5 has turned inside out relative to the arrangement according to FIG. 1 and so the inner side of the membrane has now become the outer side thereof.

During the filtering operation, the pressure filter is closed (FIG. 1). The outer jacket 1 is then rigidly fixed on the lid 11 via a bayonet closure 16 located inside the pipe 12, with one part thereof carried by an arm 17 protruding inwards from the closed end face of the outer jacket 1 and the other part thereof fixedly arranged in the pipe 12. By applying negative pressure to the connection piece 6, the membrane 5 assumes approximately the position drawn in FIG. 1 and so suspension to be filtered can be introduced through a feed pipe 18 provided on the lid 11. After completion of the filling operation, by applying excess pressure to the connection piece 6, the membrane 5 can be pressed against the filter element 15 in order to press residual liquid through the filter element. The solid components of the suspension remain as filter cake on the filter element, while the filtrate pressed through the filter element 15 flows off via a flow-off pipe 19 likewise provided on the lid 11. When the filter is in the open state (FIG. 2), the filter cake can be removed from the then exposed filter element 15.

It has been found that during the transition from the state according to FIG. 2 to that according to FIG. 1, the turning of the membrane 5 into the outer jacket 1 again can be considerably facilitated by a negative pressure relative to ambient pressure being created inside the membrane as it turns in. This is easily achieved by connecting the connection piece 6 to a suction pump. When outer jacket 1 and lid 11 are brought together, the membrane 5 subjected to negative pressure does, however, tend to collapse from two sides, which produces a single fold protruding at the sides over the rim of the outer jacket 1 formed by the circumferential flange 2, 3. This single fold is schematically indicated and designated by reference numeral 21 in FIGS. 2 and 3. When outer jacket 1 and lid 11 are brought together, the edges of the fold 21 protruding at the sides come into strong rubbing contact with the rim 2, 3 of the outer jacket.

The membrane 5 is thereby slightly damaged and its service life considerably shortened.

Measures are, therefore, necessary to prevent the membrane 5 from rubbing against the rim of the outer jacket 1 when the pressure filter is being closed. It has been found that this can be achieved by external action on the membrane 5 during the turning-in procedure. For example, obstacles can be arranged in the region of the side edges of the fold 21 to prevent the membrane from protruding at the sides. The membrane 5 can thereby be forced to form several folds by itself, for example, three folds 22, 23, 24 (FIG. 4) which no longer protrude with their side edges over the rim 2, 3 of the outer jacket 1. It is also possible to act on the membrane at three or more points at the sides during the turning-in procedure, for example, by means of displaceable fingers driven by piston-cylinder units, and to thereby forcibly bring about formation of three or more folds.

A particularly simple measure for preventing formation of the single fold 21 protruding at the sides and for achieving formation of a triple or multiple fold remaining within the circumferential rim of the outer jacket 1 consists in somewhat turning outer jacket 1 and lid 11 relative to one another in the direction of the double arrow A during the turning-in of the membrane 5 and in thereby deforming the membrane 5. Surprisingly, with this relative turning of outer jacket and lid a single fold 21 no longer forms but instead the desired triple fold 22, 23, 24 illustrated in FIG. 4 is automatically created.

A further problem with the turning of the membrane 5 into the outer jacket 1 of the pressure filter is that the membrane forming a multiple fold in accordance with FIG. 4 often obstructs or even blocks with its inside wall passage of the protruding arm 17 carrying part of the bayonet closure 16 and hence closure of the filter. To solve this problem, one proceeds in accordance with the invention so as to create a free passage for the arm 17 arranged on the outer jacket 1 without contact with the membrane by a protection means arranged inside the membrane. The protection means and its mode of operation are illustrated schematically in FIG. 5. The bottom half of FIG. 5 shows the pressure filter after commencement of the bringing together of outer jacket 1 and lid 11 (not visible in FIG. 5). The top half of FIG. 5 illustrates the closed state of the pressure filter in which the membrane 5 has turned in again between the outer jacket 1 and the filter element 15.

As is apparent from FIG. 5, the protection means mentioned hereinabove which shields the arm 17 from the inside wall of the membrane 5 is designed as a telescopic tube comprised of three parts 31, 32, 33 and enclosing this arm. The telescopic tube extends between the pipe 12 and the bayonet closure part carried by the arm 17. During opening and closing of the pressure filter, the telescopic tube is extended and retracted, respectively, and, in particular, during closure of the filter and retraction of the telescopic tube, blocking of the arm 17 by the membrane 5 is prevented. During extension of the telescopic tube, its parts 31, 32, 33 are taken along by the rear rim of the bayonet closure part carried by the arm 17. During retraction, a cam 34 or the like provided on the arm 17 engages the telescopic tube.

The protection means designed as telescopic tube 31, 32, 33 in the embodiment illustrated in FIG. 5 can also be implemented in a different way. For example, the telescopic tube could be replaced by a kind of bellows or the like extending between the pipe 12 and the arm 17.

I claim:

1. A process for turning in the membrane of a pressure filter for suspensions having a boiler-shaped outer jacket, a lid coaxially turnable and movable relative to the outer jacket and releasably closing the outer jacket on the open end face thereof, a tubular filter element protruding from the lid coaxially with the axis of the outer jacket and an elastic, tubular membrane arranged coaxially between the outer jacket and the filter element and connected at its one rim to the open end face of the outer jacket and at its other rim to the free end face of the filter element remote from the lid in such a way that when lid and outer jacket are coaxially moved apart, it turns out of the outer jacket and when lid and outer jacket are coaxially brought together, it turns back into said outer jacket again, whereby during the bringing together of lid and outer jacket a negative pressure relative to ambient pressure is formed inside the membrane, the process includes the step of deforming the membrane by relative rotation of the outer jacket and the lid as the outer jacket and lid are brought together until a triple or multiple fold which does not protrude at the sides beyond the rim of the outer jacket forms in the membrane, thus to prevent the formation in the membrane of a single fold protruding at the sides beyond the rim of the outer jacket when the lid and outer jacket are brought together.

2. A pressure filter for suspensions having a boiler-shaped outer jacket, a lid coaxially turnable and movable relative to the outer jacket and releasably closing the outer jacket on the open end face thereof, a tubular filter element protruding free from the lid coaxially with the axis of the outer jacket, a closure arm arranged coaxially and rigidly in the outer jacket and entering into the filter element to connect the outer jacket with the lid and an elastic, tubular membrane arranged coaxially between the outer jacket and the filter element and connected at its one rim to the open end face of the outer jacket and at its other rim to the free end face of the filter element remote from the lid in such a way that when lid and outer jacket are coaxially moved apart, it turns out of the outer jacket and when lid and outer jacket are coaxially brought together, it turns back into said outer jacket again, whereby during the bringing together of lid and outer jacket a negative pressure relative to ambient pressure is formed inside the membrane, wherein the filter comprises protection means (31, 32, 33) arranged inside the membrane (5) to create a free passage without contact with the membrane for the closure arm (17) arranged in the outer jacket (1).

3. A pressure filter as defined in claim 2, wherein the protection means are designed as a telescopic tube (31, 32, 33) which encloses the closure arm (17) and is extended and retracted by the closure arm (17) when the pressure filter is opened and closed, respectively.

* * * * *